M. KARMINSKI & C. PETERS.
AUTOMOBILE.
APPLICATION FILED OCT. 7, 1910. RENEWED NOV. 26, 1912.
1,052,829.
Patented Feb. 11, 1913.
2 SHEETS—SHEET 2.
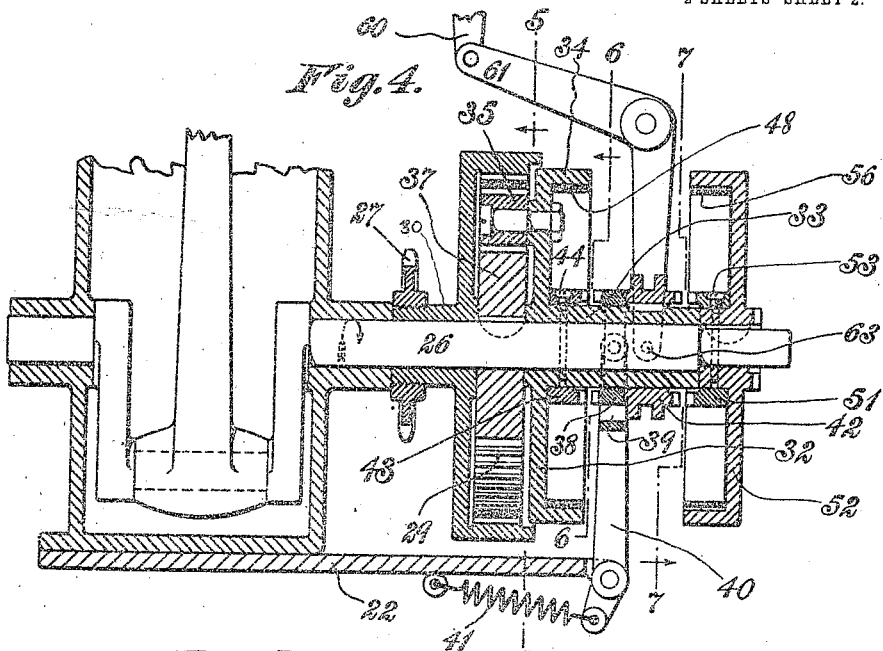
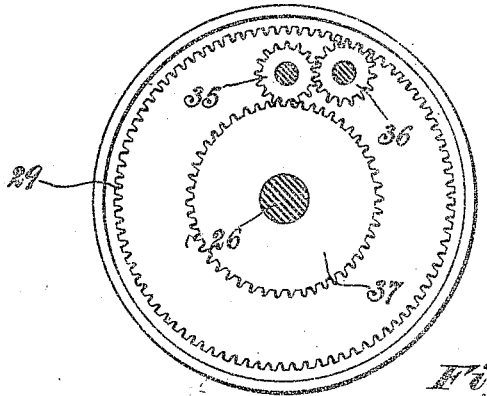
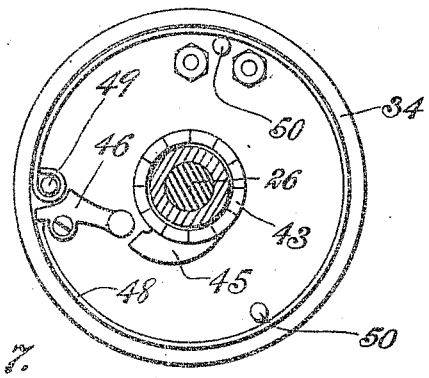
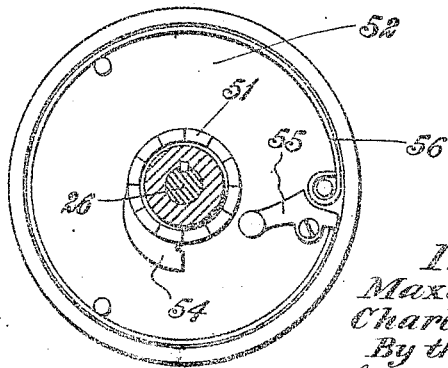
Witnesses:
Inventors:
Maxim Karminski
Charles Peters
By their Attorneys
Sutherland & Anderson

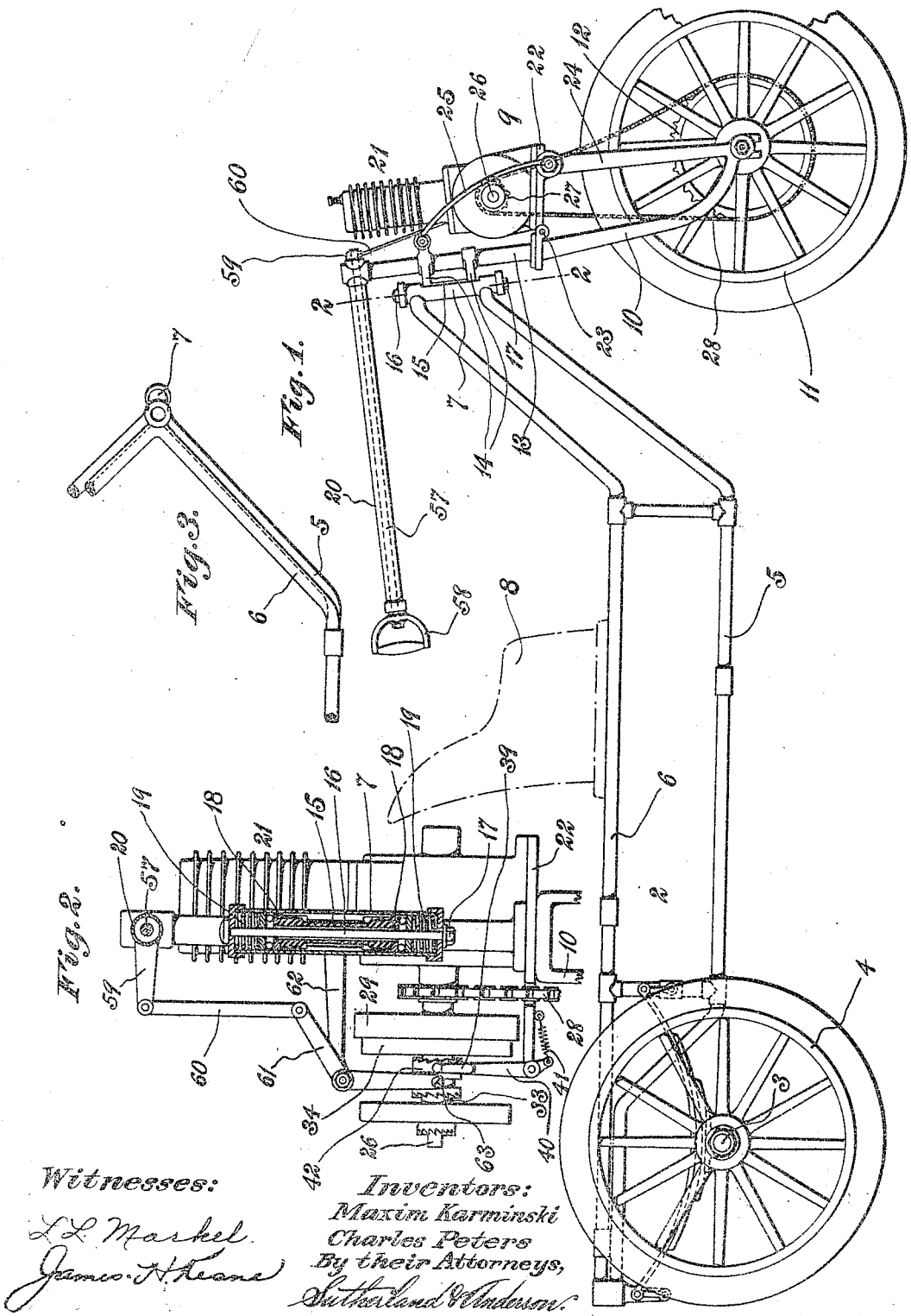

UNITED STATES PATENT OFFICE.

MAXIM KARMINSKI AND CHARLES PETERS, OF THOMPSONVILLE, CONNECTICUT.

AUTOMOBILE.

1,052,829.                Specification of Letters Patent.    Patented Feb. 11, 1913.

Application filed October 7, 1910, Serial No. 585,834.   Renewed November 26, 1912.   Serial No. 733,705.

*To all whom it may concern:*

Be it known that we, MAXIM KARMINSKI and CHARLES PETERS, subjects of the Emperor of Germany, residing at Thompsonville, in the county of Hartford and State of Connecticut, have invented certain new and useful Improvements in Automobiles, of which the following is a specification.

This invention relates to automobiles, the object of the invention being to provide simple and effective means for supporting the driving motor and coöperating parts.

Referring to said drawings: Figure 1 is a side elevation of an automobile involving our invention. Fig. 2 is a vertical section on the line 2—2 of Fig. 1. Fig. 3 is a top plan view of the forward portion of the chassis. Fig. 4 is a transverse section of the crank case and the transmission mechanism. Figs. 5, 6 and 7 are cross sections on the lines 5—5, 6—6 and 7—7 respectively of Fig. 4.

The views, as will be evident, are on different scales and in the same like characters refer to like parts.

An automobile including our invention embodies in its make-up a chassis, and there are various kinds of chassis which we may employ, although the one designated in a general way by 2 meets the desired conditions, there being connected with said chassis a rear axle 3 provided with wheels 4 which, as will be clear, are not directly power driven as is the custom with cars now in general use. The chassis is represented as having lower and upper longitudinally extending side bars 5 and 6 which forwardly converge and are upwardly and forwardly inclined at their front, the several bars being shown united by a crown piece 7 which may, as shown, consist of a somewhat vertically elongated sleeve or tube, and this crown piece or tube presents a convenient device for the connection with the chassis of the driving steering unit to which we have already referred. The chassis may be provided with a seat 8 for the driver, and back of this seat, if desired, there may be arranged a body which we have not shown, as this does not concern the invention, for as to these details there will be some variation. It might be remarked, however, that the vehicle is particularly applicable to store-delivery work in cities, although it can be employed in any field where automobiles are usually utilized.

A steering and driving unit such as satisfactorily answers our purpose is that denoted in a general way by 9, although this unit may be varied considerably in its organization. That shown, however, includes a fork 10 between the branches of which the steering and propelling wheel 11 is rotatively mounted. There are various kinds of gearing which we may employ for driving the wheel 11, although sprocket gearing is satisfactory for securing such result, and in this connection we have shown as rigidly connected with the front or steering wheel 11 the sprocket wheel 12 of comparatively large diameter, and the means shown for driving the sprocket wheel will be hereinafter more fully described. The post 13 of the fork is shown provided with rearwardly extending superposed projections 14 adapted to enter an elongated slot 15 in the crown piece 7 and to receive a suitable pivot as a pin as 16 connected with the chassis, the projections being perforated to comparatively freely receive the pin which, as shown, projects through openings in the top and bottom of the crown piece, being held removably in position, as illustrated, by a nut 17.

The fork 10 and chassis 2 in the present case are associated for relative yielding up and down movement, and this action, as will now appear, may be obtained by spring means. Engaging the outer faces of the projections 14 are anti-friction members 18 and between said bearings and the outer closed ends of the crown piece 7 are interposed coiled springs 19 each bearing being shown as consisting of superposed washers through which the pivot pin 16 extends and between which are arranged balls. When there is any relative movement in the chassis and fork, the same is resisted yieldingly by the springs. The post 13 of the fork 10 is shown provided with a rigid steering bar or arm 20 which is preferably made hollow for a purpose which will hereinafter appear, and the inner extremity of this steering bar or arm is within convenient reach of the operator of the machine occupying the seat 8 whereby he can properly steer the vehicle.

The fork 10 is preferably resilient and this effect may be obtained by making its branches longitudinally curved as shown. Owing to the presence of the springs 19 to which we have already referred, the shocks applied to the fork cannot be transferred to the chassis but are absorbed by the springs 19 in alternation while the resiliency of the fork makes the same self-cushioning, although we need not altogether rely upon the resiliency of the fork to provide for the action indicated, separate means hereinafter described being provided to receive the jars applied to the fork.

As we have already stated the motor for operating the front wheel 11 may be of any suitable kind, and the hydrocarbon motor 21 properly answers our requirements, said motor or engine being supported by the shelf or platform 22 movably connected as by a pivot joint 23 with the fork 10. In the present case the crank casing of the motor 21 is rigidly connected with said shelf or platform and the latter, as will hereinafter appear, also supports the transmission gearing. The fork 10 is shown provided at the hubs of its branches with upwardly extending arms 24 pivoted at their upper ends to the opposite sides of the shelf or platform near the front of the latter, and owing to the fact that the fork is resilient, we provide by such construction that the engine support or shelf 22 be yieldingly mounted and to increase the effect, we may interpose between the outer or front side of the platform and the post 13, springs 25, the latter also augmenting the effect of the resilient portion of the fork.

The crank shaft of the engine or motor is designated by 26, and it supports, although not directly, as will hereinafter appear, a sprocket wheel 27 connected by the sprocket chain 28 with the sprocket wheel 12 to which we have already referred, and it will be apparent that on the rotation of the sprocket wheel 27, the wheel 11 through the intermediate parts will be rotated.

We provide in connection with the crank shaft transmission mechanism of such nature as to secure two speeds, and although we have found the transmission mechanism illustrated and now to be described, as quite satisfactory, other means of a radically different form might be employed in lieu thereof.

Loosely mounted on the crank shaft 26 is an internal gear 29 having an elongated hub 30 to which the sprocket wheel 27 is rigidly connected, as for illustration, by a screw thread joint. Adjacent to the gear 29 is a disk 32 having an elongated hub 33 loose on the crank shaft 26, said disk 32 being provided with an outwardly extending flange 34, the function of which will hereinafter be described. This disk 32 presents a suitable carrier for the pinions 35 and 36, rotatively mounted on said disk and being in mesh with each other. The inner pinion 35 is in mesh with a spur gear 37 keyed or otherwise suitably rigidly connected with the crank shaft 26, while the outer gear is in mesh with the teeth of the internal gear 29. It will be clear that if the disk 32 be held against rotation and the crank shaft 26 rotated, the sprocket wheel 27 will be driven, the drive being from the shaft 26 to the spur gear 37 to the pinions 35 and 36 and gear 29 to said sprocket wheel 27. The elongated hub or sleeve 33 is shown as provided with a longitudinally slidable ring 38 which, although it is free to slide on said hub is held against turning movement therewith by the fork 39 on the lever 40 fulcrumed between its ends on the shelf or platform 22, a coiled spring 41 being connected with the lower and short branch of said lever 40 and also with the relatively stationary platform 22 so as to exert a constant tendency to swing the upper and forked arm of the lever 40 outward and thereby hold the ring 38 in its ineffective position at which time it engages against the member 42, the engaging faces of the two parts being practically plain. Complemental to the ring 38 is a ring 43 fitted to the hub 33 and held against lateral movement thereon by a screw 44, the inner reduced end of which fits an annular groove in the hub 33. From this it will be evident that the ring 43 is capable of turning on said hub 33. The two rings 38 and 43 are provided with coöperating teeth which are out of engagement when the low speed mechanism is not in action. The ring 43 is provided with a projection or tappet 45 coöperative with the tail of the lever 46 pivoted between its ends to the outer face of the disk or gear carrier 32, the operative end of the lever being adapted to engage one end of a divided or split band 48, the other end of said band being coiled about a pin 49 on the disk 32 and said divided band 48 being held in place and in contact with the inner surface of the flange 34 by suitably placed pins 50 on the said disk 32. In Fig. 4 the non-rotative ring 38 is shown as occupying its shifted or ineffective position, the low speed mechanism at this time being out of action. To throw in the low speed mechanism the member 42 will be slid to the left in Fig. 4 to cause the side teeth of the ring 38 to engage corresponding teeth on the ring 43 and thereby clutch or couple said two rings together. The ring 38 is the part or member which in the present case is utilized to prevent rotation of the disk or gear carrier 32, this result being accomplished by the clutching of the two rings and owing to the presence of the divided band 48, the locking or arresting action applied to the disk 32 is a yieldable one or one in which there is no shock, the split or divided band 48 taking up any shock by virtue of the fact that the tappet 45 engages the tail of the lever 46 and the latter in turn applies its effect to the shock absorbing element or divided band 48.

The part 42 in addition to serving as a shifting device for the ring 38 also acts as a clutch member to throw in the high speed, it being in the present case keyed to the sleeve 33, and its outer side teeth being adapted to coöperate with substantially similar side teeth on the ring 51 loosely carried by the hub of the disk 52 and held against lateral movement thereon by a pin 53, a counterpart of the pin 44 to which reference has already been made. The ring or clutch 51 is provided with a tappet 54 coöperative with the lever 55 which in turn coöperates with a divided band 56 on the disk 52 and a duplicate of the band 48 already described. There is, therefore, interposed between the ring 51 and the disk 52 a practically yieldable element which absorbs the shock which takes place on connecting the clutch members 42 and 51. It will be assumed that the clutch half 42 is connected with the clutch half 51, and when this occurs it means practically that the clutch member 42 connects the disk 52 with the sleeve 33, and owing to the fact that the disk 52 is keyed to the shaft 26, the driving will then be from the shaft 26 to the disk 52 and from the latter through the divided ring 56 to the clutch section or half 51, the clutch 42 and to sleeve 33 the flange of which carries the pinions 35 and 36. Obviously the speed of the pinion carrier is the same, when thus driven, as that of the gear 37, both being rigid with the crank shaft, and for this reason said pinions will not be rotated about their respective axes but will revolve about the axis of the crank shaft and form a rigid connection between the gear 37 keyed thereto and the internal gear 29 thus effecting the driving relation which gives the high speed to the sprocket wheel 27, the latter, as before stated, being rigidly fastened to the hub of the internal gear.

It will be understood that when the clutch or ring shifting member 42 is in its neutral position as illustrated in Fig. 4 neither the high nor low speed mechanism will be in action, notwithstanding at this time the crank shaft 26 be in operation. Therefore, if either of the mechanisms be in operation, the car may be stopped without stopping the engine by thrusting the member 42 to its neutral or intermediate position from one of its shifted positions, and we will hereinafter describe means whereby the member 42 may be operated from the driver's seat 8. It will be also understood that the two trains of gears are so proportioned as to obtain the differences in speed.

The steering post or head 13 and the bar 20 jointly support for rocking motion the shaft or rod 57 having a yoke-like handle 58 rigidly connected with that end of the shaft or rod 57 which extends beyond the rear end of the said bar or arm 20, the shaft 57 being inclosed in said bar. The handle 58 can be utilized for turning the rod or shaft 57 whereby through parts which will be hereinafter described the member 42 may be shifted sidewise. This handle 58 can also be advantageously employed to swing the bar 20 to aid in steering the vehicle. To the forward end of the shaft 57 we have shown rigidly connected the crank arm 59 to the outer end of which is pivoted a link 60 jointed at its lower end to the upper arm of the angle lever 61. The lever 61 is shown as being of elbow form and pivoted at its angle to a bearing 62 extending laterally from the cylinder of the engine 21. The lower arm of the lever 61 is forked to embrace the member 42 and it has pins 63 on its branches entering a peripheral groove or channel in said member 42. From this it will be evident that the said member 42 can be shifted from the handle 58 through the described connections to move the ring 38 into engagement with the ring 43 to throw in the low speed mechanism, can be shifted to engage the clutch half or section 51 to throw in the high speed or can be moved into the neutral position which it is shown occupying in Fig. 4 to stop the car.

What we claim is:

1. In an automobile, the combination of a chassis, a resilient fork provided with a wheel and with a post, the latter pivotally connected with a chassis, a shelf pivotally connected to the fork, the branches of the latter having rigid arms pivotally connected with said shelf forward of the other pivot thereof, and a motor supported by said shelf and operatively connected with said wheel.

2. In an automobile, the combination of a chassis, a resilient fork provided with a wheel and also with a post, the latter being pivotally connected with the chassis, a motor supporting shelf pivotally connected with the fork, the branches of the latter having rigid arms pivotally connected with said shelf at a point removed from the other pivot thereof, and spring means interposed between the shelf and said post.

In testimony whereof we affix our signatures in presence of two witnesses.

MAXIM KARMINSKI.
CHARLES PETERS.

Witnesses:
 HEATH SUTHERLAND,
 FREDERIC E. ANDERSON.